United States Patent [19]

Czerwoniak

[11] Patent Number: 5,259,512
[45] Date of Patent: Nov. 9, 1993

[54] SCREEN FOR PRESSURE SORTERS FOR FIBER SUSPENSIONS

[75] Inventor: Erich Czerwoniak, Pfullingen, Fed. Rep. of Germany

[73] Assignee: Hermann Finckh Maschinenfabrik GmbH & Co., Pfullingen

[21] Appl. No.: 743,344

[22] PCT Filed: Dec. 5, 1990

[86] PCT No.: PCT/DE90/00942
§ 371 Date: Aug. 5, 1991
§ 102(e) Date: Aug. 5, 1991

[87] PCT Pub. No.: WO91/08338
PCT Pub. Date: Jun. 13, 1991

[30] Foreign Application Priority Data

Dec. 6, 1989 [DE] Fed. Rep. of Germany ....... 3940334

[51] Int. Cl.$^5$ ............................ B07B 1/04; B07B 1/49
[52] U.S. Cl. ................................... 209/273; 209/397; 210/415; 210/498
[58] Field of Search ............... 209/268, 269, 270, 273, 209/397; 210/403, 413, 415, 498; 162/55

[56] References Cited

U.S. PATENT DOCUMENTS

| | | | |
|---|---|---|---|
| 3,581,903 | 6/1971 | Holz | 210/415 |
| 4,676,903 | 6/1987 | Lampenius et al. | 209/273 X |
| 4,717,471 | 1/1988 | Winkler | 209/273 |
| 4,842,722 | 6/1989 | Holz | 209/270 |
| 4,898,665 | 2/1990 | Lamort | 209/393 X |
| 4,950,402 | 8/1990 | Frejborg | 209/273 X |
| 4,986,900 | 1/1991 | Mason | 209/273 X |
| 5,000,842 | 3/1991 | Ljokkoi | 210/415 X |

FOREIGN PATENT DOCUMENTS

| | | |
|---|---|---|
| 0093187 | 11/1983 | European Pat. Off. . |
| 0042742 | 9/1985 | European Pat. Off. . |
| 0286535 | 10/1988 | European Pat. Off. . |
| 1157200 | 11/1963 | Fed. Rep. of Germany ...... 209/273 |
| 2750499 | 5/1979 | Fed. Rep. of Germany . |
| WO87/03024 | 5/1987 | PCT Int'l Appl. . |

Primary Examiner—David H. Bollinger
Assistant Examiner—Tuan N. Nguyen
Attorney, Agent, or Firm—Leydig, Voit & Mayer, Ltd.

[57] ABSTRACT

In a screen for pressure sorters for fiber suspensions which is of rotationally symmetrical shape in relation to a screen axis and the screen wall of which is provided with screen opening channels connecting the screen inlet side with the screen outlet side and on its inlet and outlet sides with recesses into which the screen opening channels open, in order to improve the throughput capacity of the screen, to simplify its manufacture, to achieve good fatigue strength of the screen and to generate turbulences at the screen inlet side, each of the recesses on the inlet side extends over several screen opening channels and is in the form of a groove extending transversely to the circumferential direction of the screen, a recess is provided for each screen opening channel on the screen outlet side, and the largest width of the recesses on the outlet side is at least as large as the largest width of the grooves on the inlet side.

13 Claims, 2 Drawing Sheets

SCREEN FOR PRESSURE SORTERS FOR FIBER SUSPENSIONS

FIELD OF THE INVENTION

The invention relates to a screen for pressure sorters for fiber suspensions comprising a rotor, in particular, adjacent to an inlet side of the screen, for generating positive and negative pressure thrusts in the fiber suspension, the screen having a shape which is rotationally symmetrical in relation to a screen axis.

BACKGROUND OF THE INVENTION

In the processing of fiber suspensions, as a rule, several such pressure sorters are connected one behind the other, with the screen openings of the pressure sorters connected one behind the other becoming smaller and smaller, i.e., the screen openings of the pressure sorters following a first pressure sorter are always smaller than the screen openings of the preceding pressure sorter. In this way, impurities and clumps of fibers are separated in dependence upon their size stepwise from the usable fibers as the so-called accepted material of the preceding pressure sorter is fed to each pressure sorter (the accepted material is that part of the fiber suspension which has passed through the screen openings of a pressure sorter).

The paper industry demands apparatus with greater and greater capacity; for pressure sorters this means that not only a higher and higher specific throughput capacity is called for (amount of fiber suspension passing through a screen surface of a certain size per time unit) but that a certain sorting fineness is to be attainable with fewer and fewer pressure sorters connected one behind the other, which is only achievable with relatively fine screen openings, which does, however, conflict with the increasing of the throughput capacity.

Therefore, to increase the throughput capacity not only new rotor shapes were developed, but the circumferential speed of the rotor regions adjacent to the inlet side of the screen was also increased in order to generate relatively high positive and negative pressure thrusts and turbulences in the fiber suspension - clogging of the screen openings by impurities contained in the fiber suspension is to be prevented by the pressure thrusts (backwashing effects occur at the screen openings) and the turbulences are to prevent the fibers from forming at the inlet side of the screen a kind of fibrous mat which reduces the throughput capacity or prevents passage of usable fibers through the screen openings altogether. The measures for increasing the throughput capacity (increasing the rotor speed and the rotor circumferential speed as well as increasing the pressure difference occurring at the screen) do, however, result in the forces acting on the screen becoming greater and greater, and they often cause rapid destruction of the screen, in particular, as a result of cracks occurring in the screen plate. To achieve higher service lives, i.e., to obtain more resistant screens, one has, therefore, increased the wall thickness of the screens; as a result of this measure, the flow channels formed by the screen openings are, however, also increased in length, a consequence which negatively affects the throughput capacity of the pressure sorter. Moreover, the demand for more and more efficient apparatus has not only resulted in a pressure sorter having to process greater and greater fiber suspension quantities per hour, but in it also having to process fiber suspensions with a higher substance density (fiber component per volume unit) and, above all, with fiber suspensions of relatively high substance density, comparatively long screen opening channels lead to high pressure losses between the inlet side and the outlet side of the screen which, in turn, result in rapid clogging of the screen openings.

A wide variety of suggestions has already been made for the design of the screen wall of such screens:

In U.S. Pat. No. 3,581,903 of the applicant, it was suggested that in a screen with slit-shaped screen opening channels a boat-shaped recess be milled in the outlet side of the screen wall for each screen opening and such a screen be installed in a pressure sorter in which the rotor rotates adjacent to the outlet side of the screen. This measure does considerably reduce the danger of clogging of the screen openings by impurities contained in the fiber suspension, but with such pressure sorters there is the danger that a fibrous mat or the like will form in the fiber suspension to be sorted on the inlet side of the screen and drastically reduce the throughput capacity.

A screen for pressure sorters is proposed in DE-AS 27 50 499. This is comprised of ring-shaped segments stacked one on top of the other in the direction of the screen axis and each comprising a ring of slit-shaped screen opening channels, each two adjacent segments defining rings of recesses which extend from the inlet side and the outlet side of the screen as far as the screen opening channels and taper towards the latter. Such a screen does possess relatively short screen opening channels in the flow-through direction and it is extremely resistant to high pressure thrusts generated by a rotor, but it is highly elaborate in its manufacture and cannot prevent particularly effectively formation of a fibrous mat on the inlet side of the screen.

The same is applicable to the screen disclosed in EP-O 093 187-B of the applicant; this is provided on the inlet side with grooves extending around the entire screen in the circumferential direction of the screen and on the screen outlet side with milled, circular-cylindrical recesses, the centers of which lie in the points of intersection of a net formed by equilateral triangles and the bottom surfaces of which are perforated by the bottom of the grooves. The purpose of this screen configuration is essentially the same as in the screen according to the previously discussed U.S. Pat. No. 3,581,903, i.e., the flow-through channels formed by the screen openings are widened in the flow-through direction by the circular-cylindrical recesses. On the other hand, with this screen configuration, too, formation of a fibrous mat on the inlet side cannot be prevented particularly effectively.

From EP-0042742-B there is known a screen for pressure sorters comprising a rotor adjacent to an inlet side of the screen. The screen is of rotationally symmetrical design in relation to a screen axis, and the screen wall which is integral throughout its wall thickness is provided with screen opening channels connecting the screen inlet side with the screen outlet side and on its inlet side with recesses into which the screen opening channels open. In a first embodiment of the known screen, the screen opening channels are in the form of slits extending transversely t the circumferential direction of the screen and the recesses on the inlet side are boat-shaped recesses which are milled into the screen plate and likewise extend transversely to the circumferential direction of the screen, one such boat-shaped recess being provided for each screen opening channel (FIGS. 2 to 4 of EP-0042742-B). In a second embodiment of this known screen, the screen opening channels are circular-cylindrical bores, each having associated with it a frustoconical recess which opens into the inlet side of the screen and widens towards it with a relatively small aperture angle (FIGS. 5 and 6). With the recesses on the inlet side an increase in the throughput capacity of the pressure sorter is to be achieved by these recesses on the inlet side causing together with the rotor rotating on the inlet side turbulences which counteract the formation of a fibrous mat on the inlet side of the screen. However, an unsatisfactory throughput capacity is to be ascertained with both embodiments of the known pressure sorter, quite aside from the fact that it involves considerable expenditure to mill not only the individual slit-shaped screen opening channels but also a boat-shaped recess for each individual screen opening channel or in the second embodiment to make a frustoconical recess for each individual screen opening channel on the screen inlet side.

Finally, a pressure sorter with a circular-cylindrical screen is known from WO 87/03024. Herein screen opening channels in the form of circular-cylindrical bores connecting the screen inlet side with the screen outlet side open into groove-shaped, parallel recesses extending transversely to the circumferential direction of the screen and provided on the screen inlet side and the screen outlet side, whereby the efficiency of the screen is to be improved. This measure does result in a reduction of the pressure loss at the screen because the narrow screen opening channels—relative to the screen wall thickness—are relatively short, but the known screen design has a serious disadvantage: the groove-shaped recesses on the inlet and outlet sides extending transversely to the circumferential direction of the screen result in the formation of weakening lines in the screen wall extending parallel to the screen cylinder axis and hence to the generatrices of the screen cylinder so that it is not only problematic to produce a screen cylinder which is absolutely symmetrical with respect to rotation from a finished screen plate by bending, but, in addition, these weakening lines involve the risk of permanent fractures in the screen wall owing to the pressure thrusts generated by a rotor.

OBJECTS AND SUMMARY OF THE INVENTION

The object underlying the invention was to produce for pressure sorters comprising a rotor a durable screen, i.e., with high stability, which can be manufactured relatively simply and with which a specifically high throughput capacity can be achieved.

Proceeding from a screen for pressure sorters comprising a rotor, in particular, adjacent to an inlet side of the screen, for generating positive and negative pressure thrusts in the fiber suspension, the screen having a shape which is rotationally symmetrical in relation to a screen axis, and the screen wall which is integral throughout its wall thickness being provided on both its inlet and outlet sides with recesses connected to one another by screen opening channels, each of the recesses on the inlet side extending over several screen opening channels and being in the form of a groove extending transversely to the circumferential direction of the screen, and the largest width of the recesses on the outlet side, measured in the screen wall surface on the outlet side, being at least as large as the largest width of the grooves on the inlet side, this object is accomplished in accordance with the invention by a screen of such configuration that each of the recesses on the outlet side extends over only one of the screen opening channels respectively. In the case of slit-shaped screen opening channels, the recesses on the outlet side can, in particular, be desinned as shown in U.S. Pat. No. 3,581,903, i.e., these may be boat-shaped recesses. However, embodiments are preferred in which the screen opening channels are bores and the recesses on the outlet side are in the form of frustoconical, in particular, flat tapering countersinks.

The recesses provided on both the inlet and outlet sides of the screen permit use of relatively thick sheet metal plates for the manufacture of inventive screens without relatively narrow or fine screen opening channels resulting in high pressure losses at the screen and counteracting a high throughput capacity of the pressure sorter as the length of the screen opening channels is considerably reduced by the recesses provided on both sides. In contrast with the screen known from EP-0042742-B, a separate recess on the inlet side also does not have to be made for each screen opening channel. Together with a rotor rotating on the inlet side of the screen, the groove-shaped recesses provided on the inlet side result in the desired turbulences in the fiber suspension to be sorted, which effectively counteracts the danger of formation of clumps of fibers on the screen inlet side. The relatively large recesses on the outlet side together with the negative pressure thrusts generated by the rotor result in a powerful backwashing effect so that the screen opening channels cannot become obstructed. Finally, owing to the recesses on the outlet side each extending over only one screen opening channel, the formation of weakening lines in the screen wall is avoided, above all, when the screen opening channels are not of slit-shaped design and the recesses on the outlet side are in the form of countersinks.

Embodiments are particularly preferred wherein the grooves on the inlet side are flat, in particular approximately 1 mm deep at the most, as grooves of such depth are adequate for generation of the desired turbulences and do not weaken the screen wall to any significant extent. However, a relatively large depth of more than half of the thickness of the screen wall is recommended for the recesses on the outlet side; as each screen opening channel has a separate recess associated with it on the outlet side, these recesses do not weaken the screen wall in an inadmissible way in spite of their relatively large depth, although they result in the desired, short screen opening channels. Relations as given in further detail in the appended claims 5 to 8 are particularly advantageous.

Finally, in order that the screen will reject long fibrous impurities better, it is recommendable to arrange the grooves on the inlet side in offset relation to the axes of the screen opening channels in the direction of rotation of the rotor; in addition, the danger of clogging of the screen openings is thereby further reduced.

Regarding the dimensions of the recesses, it should be noted that, on the one hand, these should be so large that the flow velocity in the region of the recesses is so low that even with relatively high substance density, the friction losses become negligibly small but that, on the other hand, the screen wall should not be weakened by the recesses to such an extent that the required strength of the screen is no longer guaranteed.

DETAILED DESCRIPTION OF THE PREFERRED EMBODIMENT(S)

Figure 1:
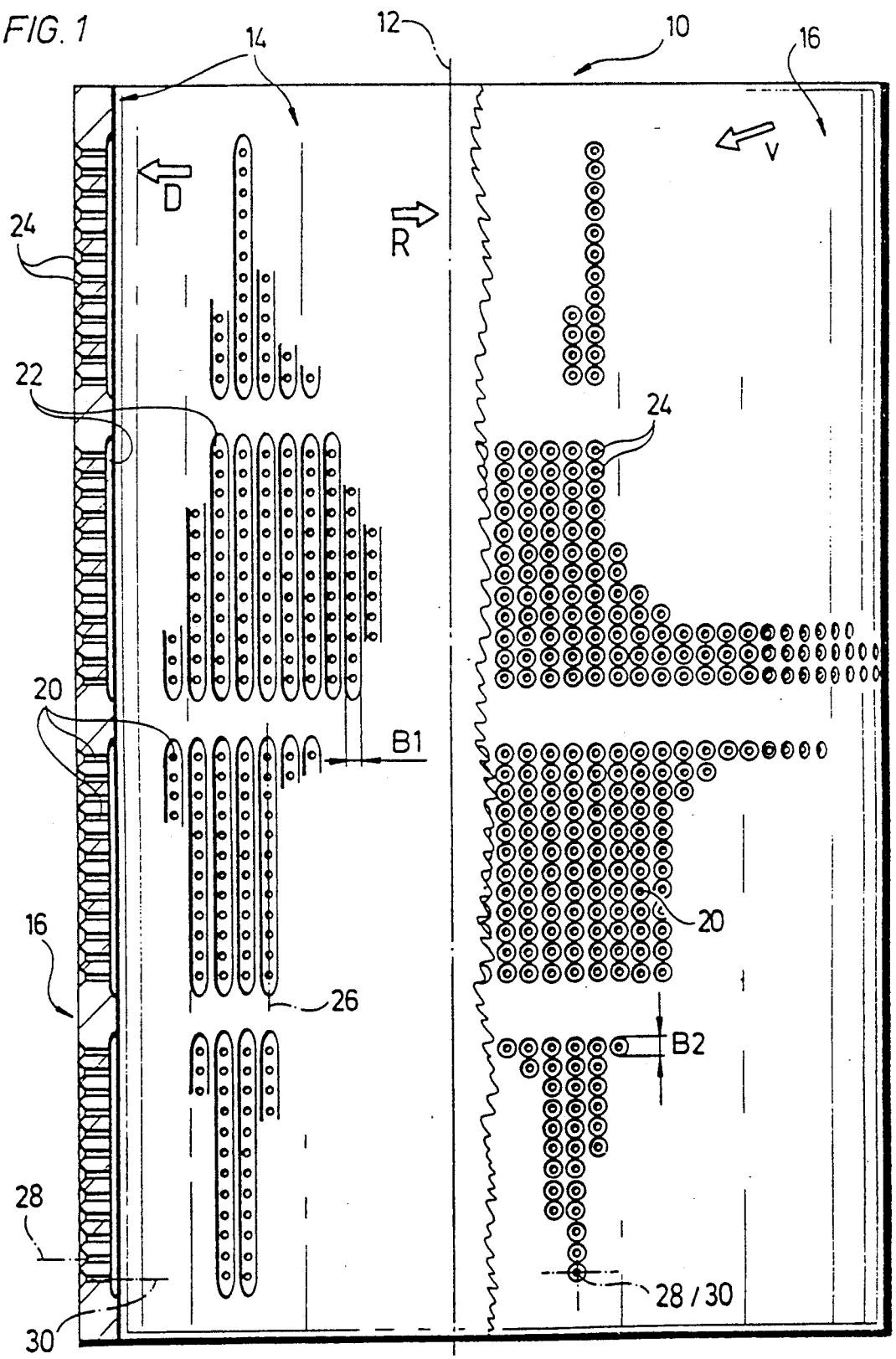
FIG. 1 a side view of a first embodiment of the inventive screen which is in the form of a circular cylinder, with the left portion shown in section along a diameter plane.
Figure 2:
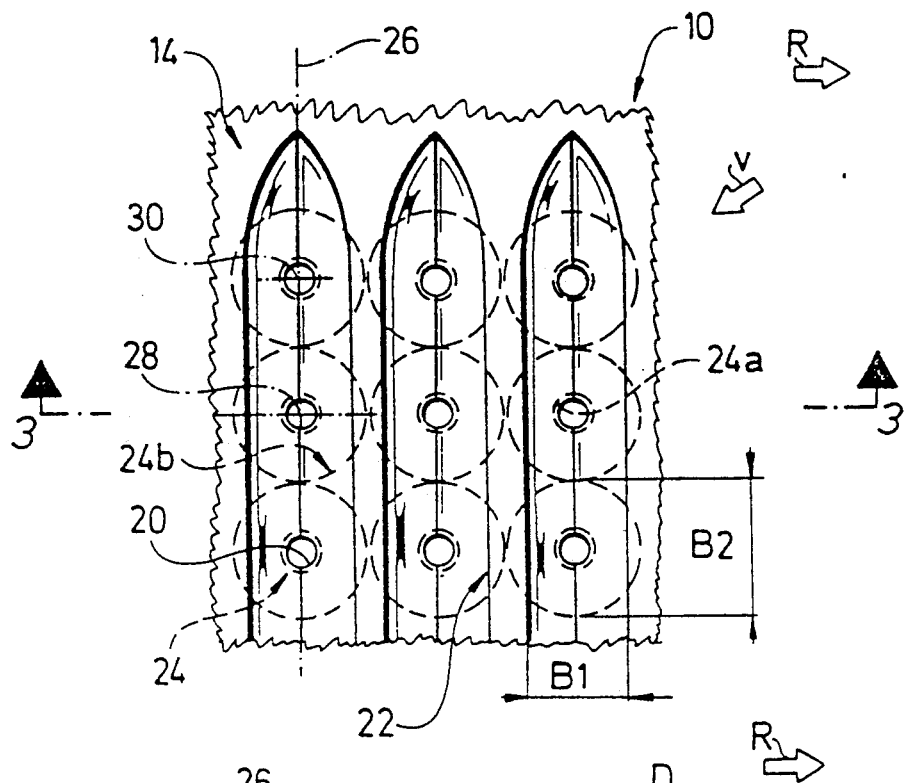
FIG. 2 a view of part of the screen wall of the screen according to FIG. 1, seen in the direction of arrow "D" in FIG. 1 (view of the inlet side of the screen)
Figure 3:
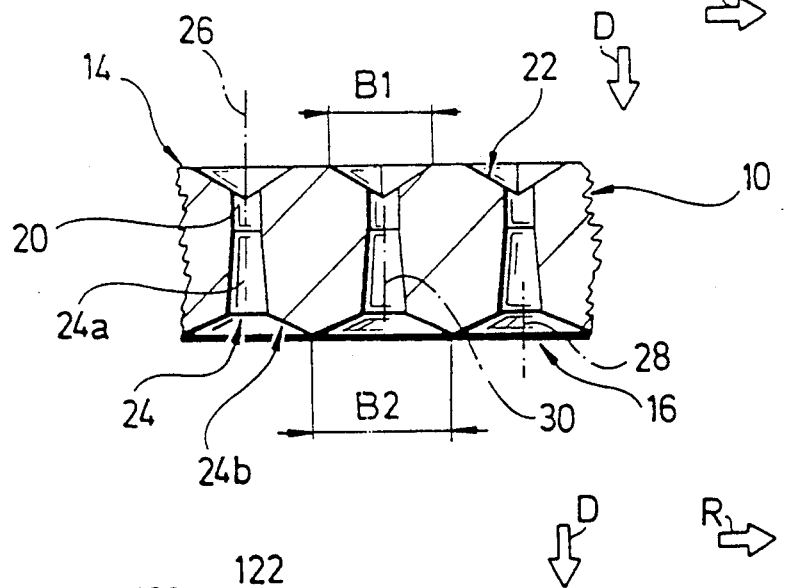
FIG. 3 a section along line 3—3 in FIG. 2.

The screen shown in FIGS. 1 to 3 comprises a screen wall 10 made from a metal plate and bent to a circular cylinder; this screen is intended for pressure sorters in which the fiber suspension to be sorted is introduced into the interior of the screen cylinder formed by the screen wall 10 and which comprise a rotor, the axis of rotation of which coincides with the axis 12 of the screen cylinder. Such a pressure sorter is, for example, described and illustrated in EP-0042742-B. As the fiber suspension to be sorted is, as a rule, fed to the screen from the top and as the rotor circulates the fiber suspension to be sorted at the inlet side of the screen, the fiber suspension to be sorted moves in helical configuration from the top to the bottom along the inlet side of the screen wall 10, as indicated by arrow "v" in FIG. 1. The inlet side of the screen is designated 14, the outlet side 16. The direction in which the fiber suspension passes through the screen is marked by arrow "D" in FIGS. 1 to 4.

As is apparent from FIGS. 1 to 3, screen opening channels 20 are machined in the screen wall 10. In the illustrated preferred embodiment, these consist of a cylindrical bore 20. The screen opening channels 20 are, as is clearly apparent from FIG. 1, arranged in groups, in accordance with the invention, in the screen wall 10, with each group forming a row of screen opening channels 20 lying one behind the other in the direction of the axis 12. For each of these groups, there is milled in the inlet side 14 of the screen wall 10 a first recess 22, all of these recesses being approximately boat-shaped in the plan view, having a triangular cross-section and thus forming a groove, the width of which is designated B1. All of these grooves also extend parallel to one another and parallel to the screen cylinder axis 12.

In accordance with the invention, there is machined in the screen outlet side 16 of the screen wall for each screen opening channel 20 a recess 24 which, in accordance with the invention, is comprised of a conical bore 24a and a flat tapering countersink 24b which both widen in the flow-through direction D. On the screen wall surface on the outlet side, the width or diameter of the recesses 24, i.e., the width B2, is, in accordance with the invention, equal to or greater than the width B1.

In a preferred screen, the thickness of the screen wall 10 is approximately 8 mm, the grooves 22 are only 1 mm deep, and the length of the screen opening channels 20, measured in the flow-through direction D, is only approximately 0.5 mm so that the depth of the recesses 24 or 24a, 24b is approximately 6.5 mm.

In the embodiment according to FIGS. 1 to 3, the axes 28 of the recesses 24 on the outlet side and the axes 30 of the screen opening channels 20 lie in the center plane 26 of the recesses 22 on the inlet side, i.e., in this embodiment there is no offset of the recesses and the screen opening channels in the direction of rotation "R" of the rotor which is not illustrated.

Figure 4:
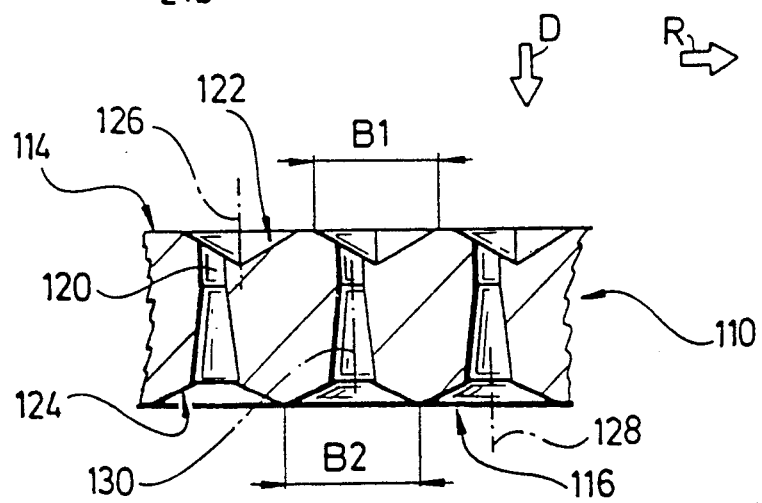
FIG. 4 an illustration corresponding to FIG. 3 of the second embodiment of the inventive screen.

The second embodiment according to FIG. 4 differs in this respect from the first embodiment. In FIG. 4, the screen wall is designated 110, its inlet side 114 and its outlet side 116, the likewise boat-shaped recesses on the inlet side 122 and the recesses on the outlet side likewise in the form of a combination of conical bores and flat tapering countersinks 124, the screen opening channels connecting the recesses with one another 120, their axes 130, the center planes of the recesses on the inlet side 126 and the axes of the recesses on the outlet side 128. FIG. 4 shows that in this embodiment, in accordance with a further feature of the invention, the center planes 126 of the recesses 122 on the inlet side are offset in relation to the axes 130 of the screen opening channels 120 in the direction of rotation "R" of the rotor which is not illustrated, whereas the axes 128 of the recesses 124 on the outlet side coincide with the axes 130 of the screen opening channels 120. The offset of the recesses 122 on the inlet side is, as shown in FIG. 4, selected such that the screen opening channels 120 are spaced rearward of the center plane 126 (viewed in the direction of rotation "R" of the rotor), opening entirely within the rearwardly rising side wall of the groove-shaped recesses 122.

Owing to the groove-shaped recesses 22 and 122, respectively, on the inlet side extending transversely to the influx velocity v of the fiber suspension to be sorted, turbulences are generated at the inlet side 14 and 114, respectively, of the screen wall and counteract clogging of the screen openings and formation of a fibrous mat on the screen inlet side. The recesses 22 and 122, respectively, on the inlet side can be machined in a simple way in the metal plate forming the screen wall 10 and 110, respectively, using a milling cutter with a profiling disc, without the stability of the screen wall thereby being reduced to too great an extent.

I claim:

1. A screen for use in pressure sorters having a rotor for generating positive and negative pressure pulses in a fiber suspension, said screen comprising a screen wall of a shape which is rotationally symmetrical in relation to a screen axis and which comprises sheet metal throughout the wall thickness of the screen and over the entire circumference of the screen, the screen having a plurality of recesses on both its inlet and outlet sides and a plurality of screen opening channels extending generally radially of said screen between and opening into said recesses on said inlet and outlet sides for communication therebetween, each of said recesses on the outlet side extending over only one of said screen opening channels and being in the shape of a combination of a tapered bore adjoining the respective screen opening channel and widening towards said outlet side and a shallow outer end recess portion adjoining said tapered bore and providing an abrupt transition from said tapered bore to a substantially larger outlet recess width, each of said recesses on the inlet side extending over several screen opening channels and being in the form of a groove extending transversely to the circumferential direction of said screen, and said outlet recess width of said recesses on the outlet side, measured in the screen wall surface on the outlet side, being at least as large as the largest width of the grooves on the inlet side.

2. A screen as defined in claim 1 wherein said grooves on the inlet side are arranged in offset relation to the axes of said screen opening channels in the direction of rotation of said rotor.

3. A screen as defined in claim 1 wherein said outer end recess portions on the outlet side comprise frusto-conical countersinks.

4. A screen as defined in claim 3 wherein said countersinks on the outlet side are in the form of flat tapering countersinks, the taper of which forms at the tip in cross-section an angle of at least 90°.

5. A screen as defined in claim 1 wherein the depth of said grooves on the inlet side is approximately 1/10 to approximately 1/5 of the total thickness of said screen wall.

6. A screen as defined in claim 1 wherein the depth of said recesses on the outlet side is approximately 4/5 of the total thickness of said screen wall.

7. A screen as defined in claim 1 wherein the length of said screen opening channels measured in the flow-through direction does not exceed approximately 1/10 of the total thickness of said screen wall.

8. A screen as defined in claim 7 wherein the length of said screen opening channels is approximately 5/100 to approximately 7/100 of the total thickness of said screen wall.

9. A screen as defined in claim 1 wherein said recesses on the outlet side respectively comprise a conical bore adjoining said screen opening channel and a countersink adjoining said bore.

10. A screen as in claim 1 wherein the inner ends of said tapered bores adjoining the respective screen opening channels conform to said screen opening channels.

11. A screen as in claim 10 and wherein said tapered bore taper narrowly and continuously from said screen opening channels to the respective adjoining shallow outer end recess portions.

12. A screen as in claim 1 and wherein said tapered bores taper narrowly and continuously from said screen opening channels to the respective adjoining shallow outer end recess portions.

13. A screen as in claim 1 and wherein said screen wall consists of sheet metal which is integral throughout the thickness of the screen.

* * * * *